United States Patent [19]

Orbell

[11] Patent Number: 5,279,137
[45] Date of Patent: Jan. 18, 1994

[54] BICYCLE ANTI-THEFT DEVICE

[76] Inventor: Joseph R. Orbell, 63 Pandora Dr., City Beach, Australia, 6015

[21] Appl. No.: 671,867
[22] PCT Filed: Oct. 26, 1989
[86] PCT No.: PCT/AU89/00462
    § 371 Date: Apr. 3, 1991
    § 102(e) Date: Apr. 3, 1991
[87] PCT Pub. No.: WO90/04535
    PCT Pub. Date: May 3, 1990

[30] Foreign Application Priority Data

Oct. 26, 1988 [AU] Australia .................... PJ1153

[51] Int. Cl.⁵ .................... B62H 5/04; E05B 71/00
[52] U.S. Cl. .................... 70/218; 70/233; 70/386; 280/279; 280/280; 403/374
[58] Field of Search .......... 70/218, 233, 386, 188, 70/189, 236; 403/374; 280/279, 280

[56] References Cited

U.S. PATENT DOCUMENTS

| | | |
|---|---|---|
| 1,471,553 | 10/1923 | Fell . |
| 1,531,325 | 3/1925 | White .................... 74/527 |
| 1,623,455 | 4/1927 | Andrew .................... 70/219 |
| 2,139,984 | 12/1938 | Southwell et al. .......... 70/233 |
| 3,785,676 | 1/1974 | Klein, Jr. .................... 70/233 X |
| 4,030,321 | 6/1977 | Kenyon .................... 70/386 X |
| 4,901,544 | 2/1990 | Jang .................... 70/218 |
| 5,085,063 | 2/1992 | Van Dyke et al. ............ 70/233 X |

FOREIGN PATENT DOCUMENTS

| | | |
|---|---|---|
| 460164 | 5/1928 | Fed. Rep. of Germany . |
| 642793 | 5/1928 | France .................... 70/218 |
| 671451 | 12/1929 | France . |
| 691211 | 10/1930 | France . |
| 755302 | 11/1933 | France . |
| 885347 | 9/1943 | France . |
| 2575713 | 7/1986 | France . |
| 176222 | 3/1922 | United Kingdom . |

*Primary Examiner*—Lloyd A. Gall
*Attorney, Agent, or Firm*—Eckert Seamans Cherin & Mellott

[57] ABSTRACT

A device for discouraging theft of a bicycle includes a first tube member attached to the bicycle handlebar and a second tube member attached to the bicycle fork. One of the tube members has apertures carrying rolling bodies, and the other of the tube members has recesses for receiving the rolling bodies. The tube members are concentrically rotatable. A cam member is provided for urging the rolling bodies into the recesses to fix the tube members against relative rotation, thereby enabling steering of the bicycle. The cam member is operable to a position wherein the rolling bodies are free to become retracted into the apertures, thereby decoupling the tube members and disabling steering of the bicycle.

8 Claims, 4 Drawing Sheets

BICYCLE ANTI-THEFT DEVICE

DESCRIPTION

The present invention relates to an anti-theft device.

FIELD OF THE INVENTION

In particular the present invention is particularly intended to use with a bicycle especially a bicycle, though it is to be understood that the invention is of general applicability.

SUMMARY OF THE INVENTION

In accordance with one aspect of the present invention there is provided an anti-theft device comprising a pair of members concentrically rotatable with respect to each other, one member having an aperture, the other member having a recess, a rolling body carried in the aperture, said recess and aperture being capable of being aligned on relative rotation between said members whereby the rolling body is receivable in both the aperture and recess, a locking means having a locked mode at which the locking means engages said rolling body to maintain said rolling body in engagement with the aperture and recess, the locking means having an unlocked mode at which the rolling body is freely movable into and out of engagement with the recess when the aperture and recess are aligned and a fixing means to fix the anti-theft device to the steering mechanism of a vehicle.

In accordance with a further aspect of the present invention there is provided a vehicle fitted with an anti-theft device in accordance with the present invention.

In accordance with another aspect of the present invention there is provided a bicycle fitted with an anti-theft device in accordance with the present invention.

In accordance with yet another aspect of the present invention there is provided a bicycle head stem fitted with an anti-theft device in accordance with the present invention.

BRIEF DESCRIPTION OF THE DRAWINGS

The present invention will now be described, by way of example, with reference to the accompanying drawings, in which.

DESCRIPTION OF THE INVENTION

Figure 1:
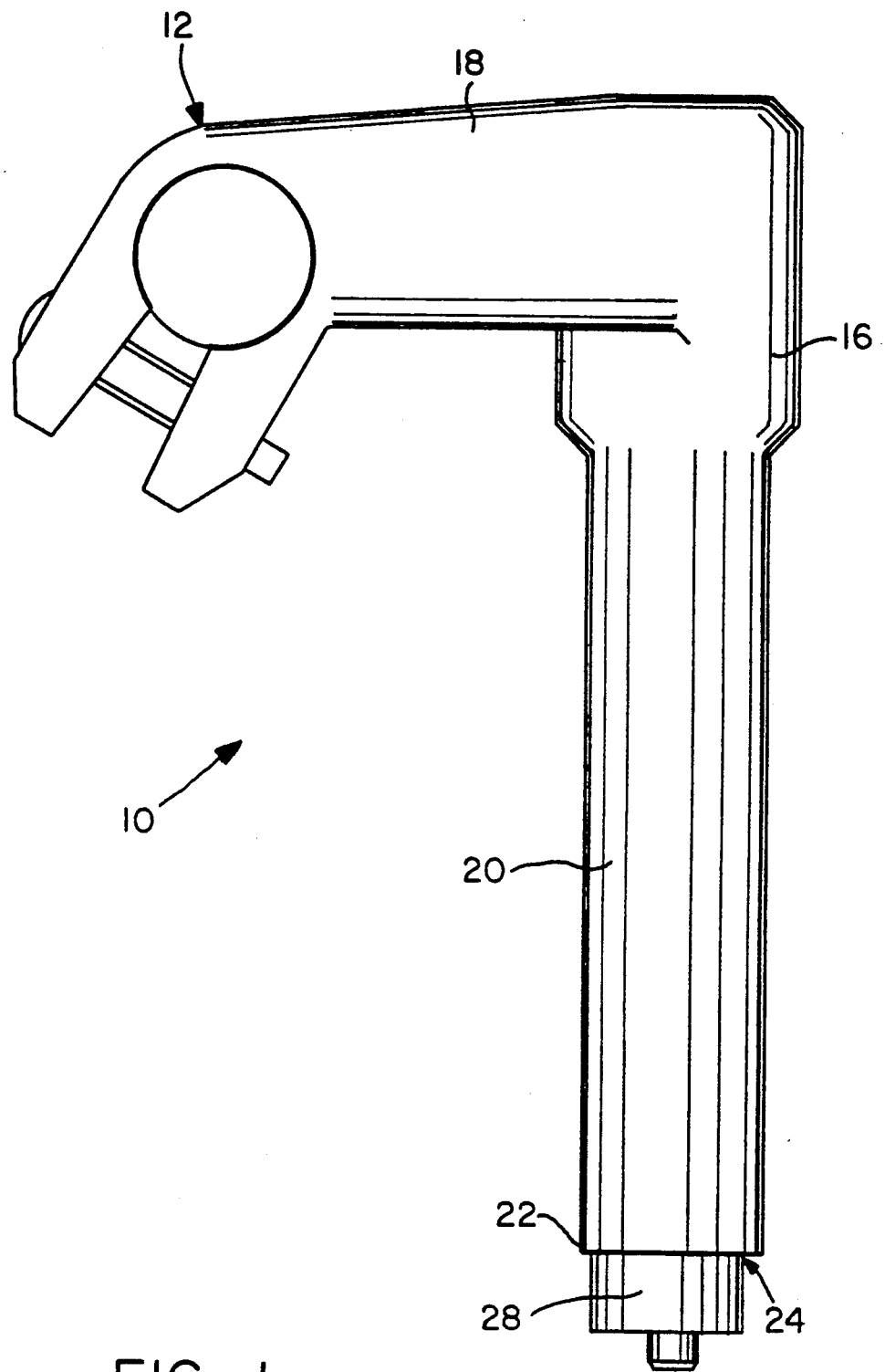
FIG. 1 is a side view of a bicycle head stem incorporating the anti-theft device of the present invention.
Figure 2:
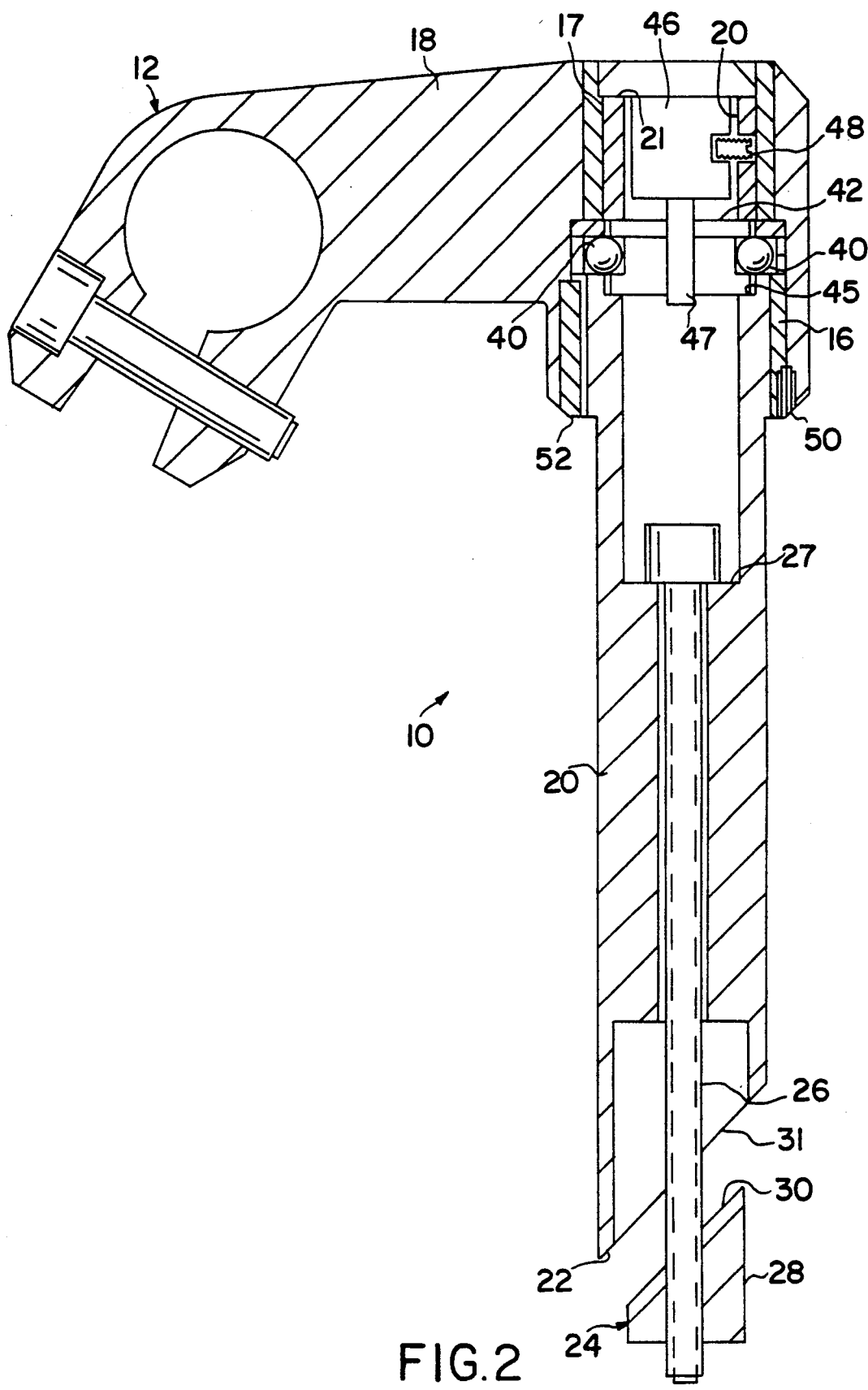
FIG. 2 is a sectional side view of the bicycle head stem of FIG. 1.
Figure 3:
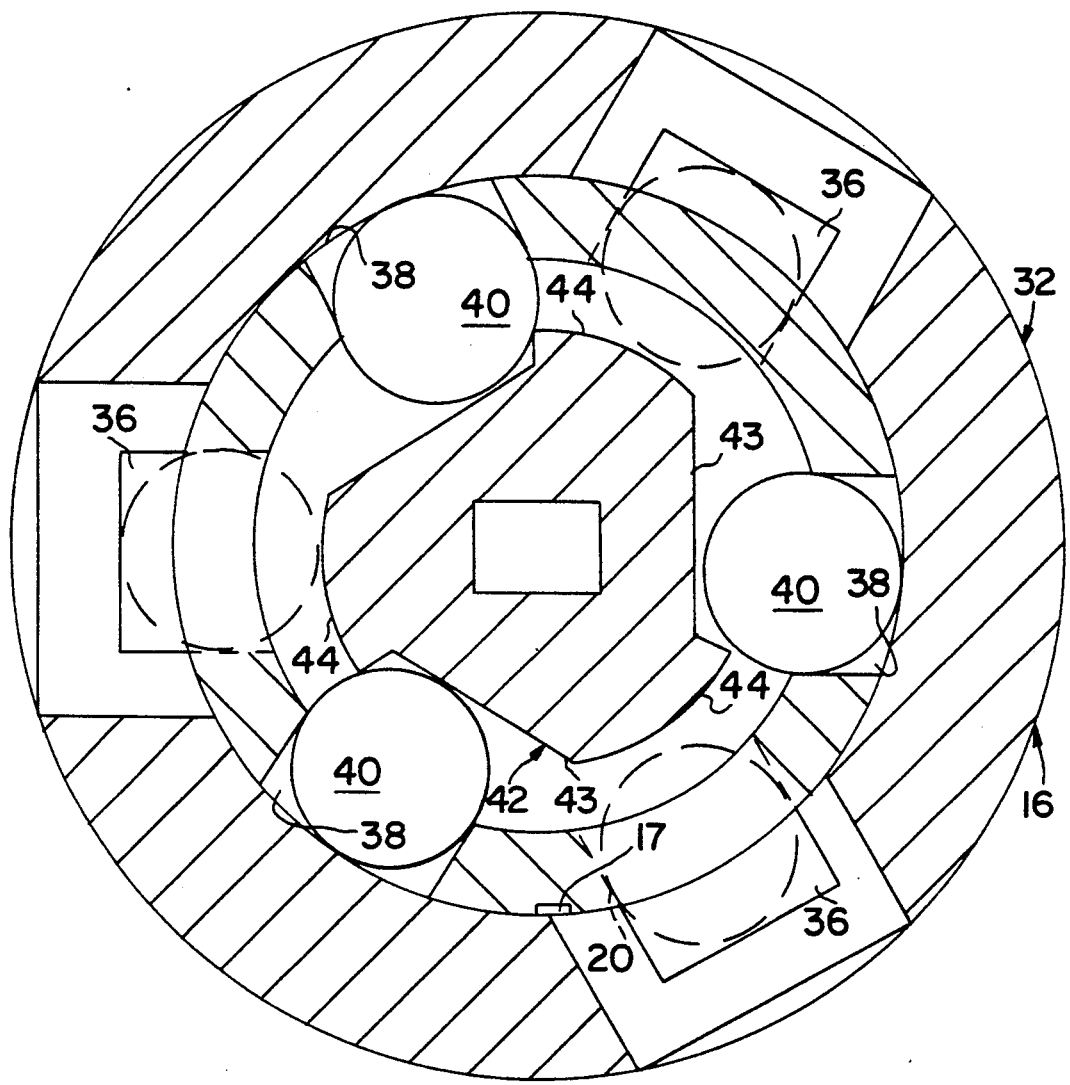
FIG. 3 is a sectional plan view of the bicycle head stem of FIG. 2.

Shown in FIGS. 1 to 3 is a bicycle head stem 10 having fixing means in the form of a clamp 12 to secure a handle bar (not shown). The clamp means 12 is spaced apart from a first tube member 16 having an inner surface 17, by means of a bridge member 18. Rotatable within the first tube member 16 is a second tube member 20 which has one end 21 located within the first tube member 16 and another end 22 located externally of the first tube member 16.

The end 22 has a securing means broadly designated by the numeral 24 arranged to secure the head stem 10 into the fork steering post of a bicycle. The securing means 24 comprises a threaded bolt 26 arranged to move a tapered plug 28 which is provided with an inclined face 30. The bolt 26 has a head which rests on an internal shoulder 27 of the second tube member 20. The end 22 may also have an inclined face 31 which in use is arranged to bear against the face 30 of the plug 28 in known manner. As a result of the inclined faces 30 and 31, when the bolt 26 is rotated, the plug 28 is forced outwardly against the headstock of the bicycle and thereby secures the stem 10. Such securing means 24 are well known in the art of bicycles.

Shown in FIG. 3 is an anti-theft device broadly designated by the numeral 32 and comprising a plurality of equi-angularly spaced radial recesses 36 on the inner surface 17 of the first tube member 16.

The second tube member 20 is provided with a plurality of equi-angularly spaced apertures 38 extending therethrough. The number of recesses provided in the first tube member 16 equals the number of apertures provided in the second tube member 20. A rolling body in the form of a cylindrical roller 40 is carried in each aperture 38. The axis of each roller 40 is disposed parallel to the longitudinal axes of the tube members 16 and 20.

Preferably the depth of each recess 36 is less than half the diameter of each roller 40 so as to allow less than half of the diameter of the roller to be accommodated into the recess 36.

The recesses 36 and apertures 38 are capable of being aligned when the tube members are rotated relative to each other, whereupon with alignment, each roller 40 is receivable in both an aperture 38 and a recess 36.

A locking means in the form of a cam member 42 is disposed on the interior shoulder 45 of the first tube member 16 and is rotatable relative to the second tube member 20.

The cam member 42 has a locked mode at which the cam member 42 engages the roller 40 and maintains the roller 40 in engagement with the aperture 38 and recess 36.

The cam member 42 also has an unlocked mode at which the roller 40 is freely movable into and out of engagement with the recess 36 when the aperture 38 and recess 36 are aligned.

The cam member 42 is provided with a first portion in the form of a lobe 44 which engages and maintains the roller 40 in engagement with the recess 36 when the cam member 42 is in the locked mode. The cam member 42 is also provided with a second portion in the form of an external face 43 which enables the roller 40 to move through the aperture 3B and out of engagement with the recess 36.

In FIG. 2, there is shown a control means in the form of a look 46 located above the cam member 42 and operatively connected to the cam member 42 by means of a generally rectangular pin 47. The look 46 is arranged to control the rotation of the cam member 42 by means of a key. A grub screw 48 passes through an aperture in the second tube member 20 to prevent the look 46 from turning within the second tube member 20.

Figure 4:
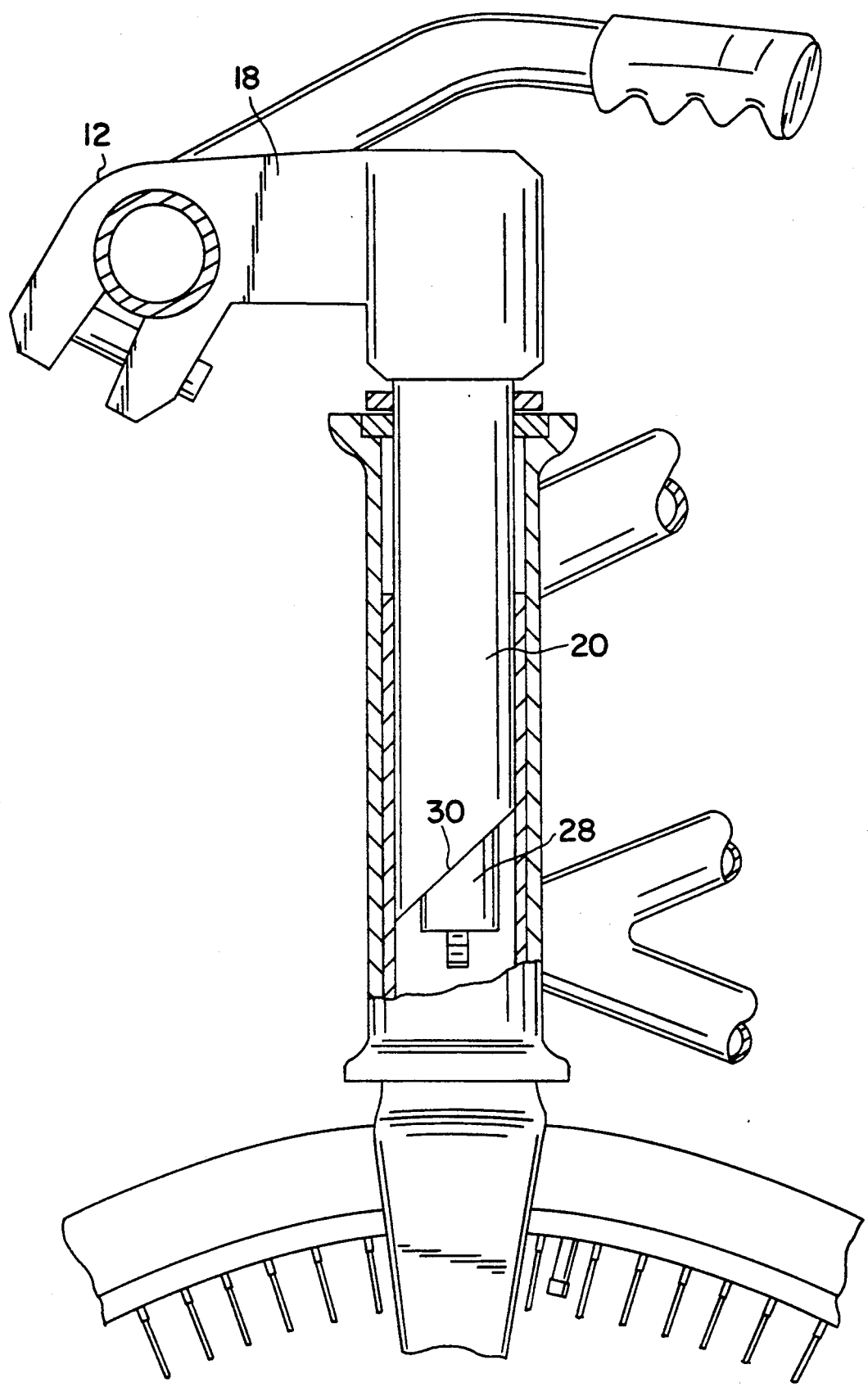
FIG. 4 is a side view showing the invention as mounted on the frame headstock of a bicycle headstock, the bicycle having a wheel on a fork, rotatable on an axis for steering the bicycle and releasable according to the invention to disable steering control.

Another grub screw 50 is disposed between the first tube member 16 and the bridge member 18 so as to firmly secure these members together. Also, for increased strength of the connection a key 52 is preferably disposed between the first tube member 16 and the bridge member 18. In use, only the second member 20 is initially partly disposed in the fork steering post of a bicycle (not shown). The bolt 26 is rotated by a suitable tool inserted through the end 21 of the second tube member 20 to cause the inclined face 30, of the plug 28, to bear against the end 22, of the second member tube 20. The plug 28 is forced outwardly against the fork steering post and thereby secures the tube 20 to the fork steering post. FIG. 4 generally illustrates the invention as mounted on the frame headstock of the bicycle.

The cam member 42 is then placed within the first tube member 16 to rest upon its interior shoulder 45. Each roller 40 is then disposed partially in a corresponding aperture 38 as shown in FIG. 3 in solid lines. The first tube member 16 is then disposed rotatably about the second tube member 20.

The lock 46 is then lowered into the second tube member 20 so as to engage the cam member 42 by means of the pin 47.

A handle bar (not shown) is then secured to the head stem 10 by means of the clamp 12, in known manner.

The stem 10 is then ready for use. Typically, in this configuration the anti-theft device 32 is in a disengaged state which is shown in FIG. 3 in solid lines.

As seen in FIG. 3, the apertures 38 are not aligned with the recesses 36 and the rollers 40 do not protrude into the recesses 36 and furthermore, the lobes 44, of the cam member 42, do not bear on the rollers 40. The first tube member 16 is thus able to rotate relative to the second tube means 20 and the handle bars are hence able to rotate relative to the front wheel of the bicycle. The handle bars are thus uncoupled from the front wheel fork and steering is not possible.

To couple the handle bars to the front wheel, and thus to enable steering, the anti-theft device 32 must be engaged. The apertures 38 are firstly aligned with the recesses 36 usually by aligning the front wheel with the bicycle and with the handle bars in their normal position. The apertures 38 and the recesses 36 are then in alignment. The lock 46 can then be operated, typically by a key which rotates the cam member 42 (clockwise as shown in FIG. 3) relative to the tubes 16 and 20 such as through 90°. The faces 43 of the cam member 42 then bear on the rollers 40 and initially urge the rollers 40 further into the apertures 38 and thus into the recesses 36. As each roller 40 enters the recess 36 the corresponding lobe 44 engages with the roller 40 and firmly locks the roller 40 in place in the recess 36. The key is then removed from the lock 46 and the cam member 42 is locked in place. The rollers 40 prevent relative rotation of the tube members 16 and 20. The handle bars are therefore not able to move relative to the forks. Thus, the handle bars are coupled to the front wheel and steering is possible. The lobes 44 ensure that the rollers 40 are retained in the locked mode and in their corresponding recesses 36 and apertures 38 at all times. When the bicycle is to be left unattended and prevention of theft is desired, the lock 46 is operated to disengage the anti-theft device 32. The lock 46 is operated to rotate the cam 42 (anti-clockwise as shown in FIG. 3) such as through 90° relative to the tube members 16 and 20. The lobes 44 no longer bear on the rollers 40 and this situation is shown in solid lines in FIG. 3. The rollers 40 are then free to move out of the recesses 36 when the tube members 16 and 20 are rotated relative to one another. The tube members 16 and 20 are thus able to move relative to each other which results in the uncoupling of the handle bars from the front wheel and renders steering impossible.

The rollers 40 protrude less than half way into the recesses 36 as described hereinbefore. If the first tube member 16 is rotated relative to the second tube member 20, the recesses 36 will contact the rollers 40 eccentrically which will tend to force the rollers 40 away from the recesses 36 and thereby facilitate relative rotation of the tube members 16 and 20.

In comparison to prior art anti-theft devices, the anti-theft devices 32, of the present invention cannot readily be forced since it uncouples the handle bars instead of locking them.

Also, bicycles can be readily placed in the boot of a car since the handle bars can be rotated relative to the front wheel. Also, bicycles can be readily leaned against walls since the front wheel can be disposed parallel to the wall whilst the handle bars are against the wall which reduces the tendency of the bicycle to roll away.

Modifications and variations such as would be apparent to a skilled addressee are deemed within the scope of the present invention. In an alternative embodiment, the roller 40 could be replaced by ball bearings.

Also, the strength of the mechanism could be increased by increasing the length of the rollers or by fitting a tandem set of rollers one above the other.

I claim:

1. An anti-theft device for discouraging theft of a bicycle having a wheel on a fork, the fork being rotatable about an axis relative to a frame headstock for steering the bicycle, and a handlebar for manually positioning the fork, the device comprising:

a first tube member having means for rigid attachment relative to the handlebar;

a second tube member having means for rigid attachment relative to the fork, the first and second tube members being concentrically rotatable with respect to each other and being coupleable and decoupleable, one of the first and second tube members having an aperture carrying a rolling body and the other of the first and second tube members having a recess for receiving the rolling body, the aperture and the recess being correspondingly positioned and dimensioned such that the rolling body resides within said aperture when the aperture and recess are misaligned, and the rolling body can be displaced partway into the recess to reside partly in the aperture and partly in the recess when the aperture and the recess are aligned; and, a locking means for coupling and decoupling the first and second tube members, the locking means having a cam member movable between a first position wherein the cam member urges the rolling body from the aperture toward the recess, for fixing the first and second tube members against relative rotation to enable steering of the bicycle, and a second position wherein the rolling body is free to become retracted into the aperture by action of relative rotation of the first and second tube members, such that steering of the bicycle is disabled.

2. The device according to claim 1, wherein the one member has a plurality of the aperture, each of the apertures carrying a rolling body, and the other member has a plurality of recesses each corresponding to one of the plurality of apertures.

3. The device according to claim 1, wherein the locking means is operable by a key to control movement of the cam member.

4. The device according to claim 1, wherein the locking means is coupled to the second tube member.

5. The device according to claim 1, wherein the means for attachment of the first tube member relative to the handlebar comprises a bridge member coupled to the first tube member, the bridge member having clamping means for securing the bridge member to the handlebar.

6. The device according to claim 1, wherein the means for attachment of the second tube member relative to the fork comprises a plug at an end of the second tube member, the plug having an inclined face for bearing against a complementary inclined face at the end of the second tube member, the plug being engageable by a bolt extending axially within the second tube member, the plug being urged against the fork by rotation of the bolt.

7. The device according to claim 2, wherein the cam member has lobes which maintain the rolling bodies within the recesses.

8. The device according to claim 2, wherein the rolling bodies have a circular cross-section.

* * * * *